(12) United States Patent
Maeta et al.

(10) Patent No.: US 6,877,800 B2
(45) Date of Patent: Apr. 12, 2005

(54) SUNROOF DEVICE

(75) Inventors: Kenji Maeta, Kariya (JP); Katsutoshi Kato, Ama-gun (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/448,100

(22) Filed: May 30, 2003

(65) Prior Publication Data
US 2003/0222481 A1 Dec. 4, 2003

(30) Foreign Application Priority Data
May 30, 2002 (JP) ........................................ 2002-158139

(51) Int. Cl.⁷ .............................................. B60J 7/22
(52) U.S. Cl. ..................................................... 296/217
(58) Field of Search ........................................ 296/217

(56) References Cited

U.S. PATENT DOCUMENTS 5,671,970 A * 9/1997 Edelmann .................... 296/217
6,299,245 B1 * 10/2001 Thiele et al. ................ 296/214
6,644,729 B2 * 11/2003 Sakai et al. .................. 296/217

FOREIGN PATENT DOCUMENTS

| GB | 1444672 | * 8/1976 | ................ 296/217 |
| JP | 169319 | * 7/1986 | ................ 296/217 |
| JP | 2000-85367 | 3/2000 | |

* cited by examiner

Primary Examiner—Dennis H. Pedder
(74) Attorney, Agent, or Firm—Finnegan, Henderson, Farabow, Garrett & Dunner, LLP

(57) ABSTRACT

A sunroof device includes a movable panel provided at a roof of a vehicle for opening and closing an opening of the roof, and a deflector provided at a front end of the opening. The deflector is movable upward above the roof and foldable below the roof depending on a position of the movable panel. The deflector has an engaging portion, and a stopping member has an engaged portion engageable with the engaging portion and movable by a first predetermined distance relative to the engaging portion until the engaging portion engages with one end of the engaged portion. The stopping member is further movable together with the deflector by a second predetermined distance relative to the roof after the engaging portion engages with the one end of the engaged portion.

15 Claims, 5 Drawing Sheets

US 6,877,800 B2

SUNROOF DEVICE

CROSS REFERENCE TO RELATED APPLICATIONS

The application is based on and claims priority under 35 U.S.C. § 119 with respect to a Japanese Patent Application 2002-158139, filed on May 30, 2002, the entire content of which is incorporated herein by reference.

FIELD OF THE INVENTION

This invention generally relates to a sunroof device which opens and closes an opening provided at a vehicle roof, and more particularly, this invention pertains to a sunroof device having a deflector which is provided at a front end of an opening and prevents wind blowing in a vehicle compartment.

BACKGROUND OF THE INVENTION

A known sunroof device has been disclosed, for example, in a Japanese Patent Laid-open Publication 2000-85367. The sunroof device has a deflector provided at a front end of an opening provided at a roof of a vehicle. The deflector can extend above an upper surface of the roof and can be folded below the upper surface of the roof. The deflector includes a hooked portion for restricting extending movement of the deflector. When the deflector exterids to the upper limit, the hooked portion contacts with a stopper provided on a vehicle frame member.

Recently, the size of the opening of a roof has been enlarged so that an occupant of a vehicle can feel more comfortable. So a deflector, which is provided at a front end of the opening to prevent aerial vibration from generating due to wind blowing in a vehicle compartment, needs to be formed so that the deflector can extend further upward above the upper surface of the roof. In the known sunroof device, above described, when a deflector with elongated extending distance is provided, height dimension of the deflector is enlarged. Thus, when the deflector is folded, larger space for housing the device is required because of the enlarged height dimension. This may cause a limited vehicle compartment space.

The present invention therefore seeks to provide an improved sunroof device capable of extending further upward as well as of being folded within a small space.

SUMMARY OF THE INVENTION

According to an aspect of the present invention, a sunroof device includes a movable panel provided at a roof of a vehicle for opening and closing an opening of the roof, and a deflector provided at a front end of the opening. The deflector is movable upward above the roof and foldable below the roof depending on a position of the movable panel. The deflector has an engaging portion, and a stopping member has an engaged portion engageable with the engaging portion and movable by a first predetermined distance relative to the engaging portion until the engaging portion engages with one end of the engaged portion. The stopping member is further movable together with the deflector by a second predetermined distance relative to the roof after the engaging portion engages with the one end of the engaged portion.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

With reference to a sunroof device 1, an embodiment of the present invention is explained below according to FIGS. 1–6.

Figure 1:
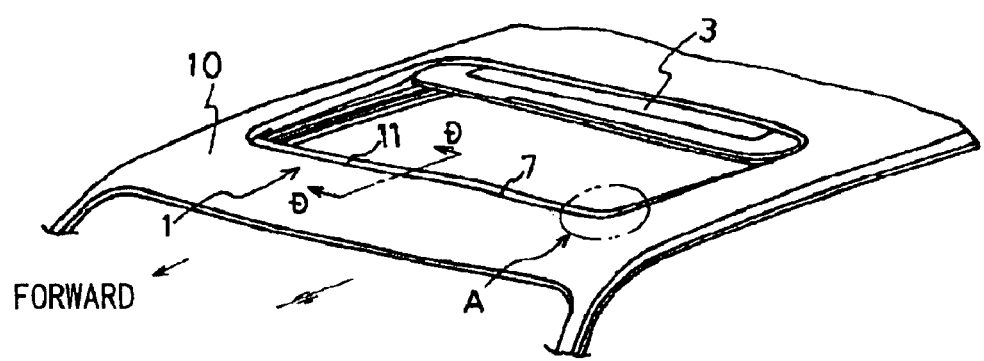
FIG. 1 is a perspective view of a sunroof device according to an embodiment of the present invention.

FIG. 1 shows a perspective view of a roof 10 including a sunroof device 1 according to the present invention. The roof 10 has an approximately plate shape, and an opening 11 having an approximately rectangle shape is provided at the roof 10. A movable panel 3 corresponding to the opening 11 is attached to the roof 10. The movable panel 3 can move forward and backward so that the opening 11 can be opened and closed. A deflector 7 is provided at a front end of the opening 11. When the opening 11 is opened by backward movement of the movable panel 3, the deflector 7 extends upward above an upper surface of the roof 10. When the opening 11 is closed, the deflector 7 is folded below the upper surface of the roof 10.

Figure 6:
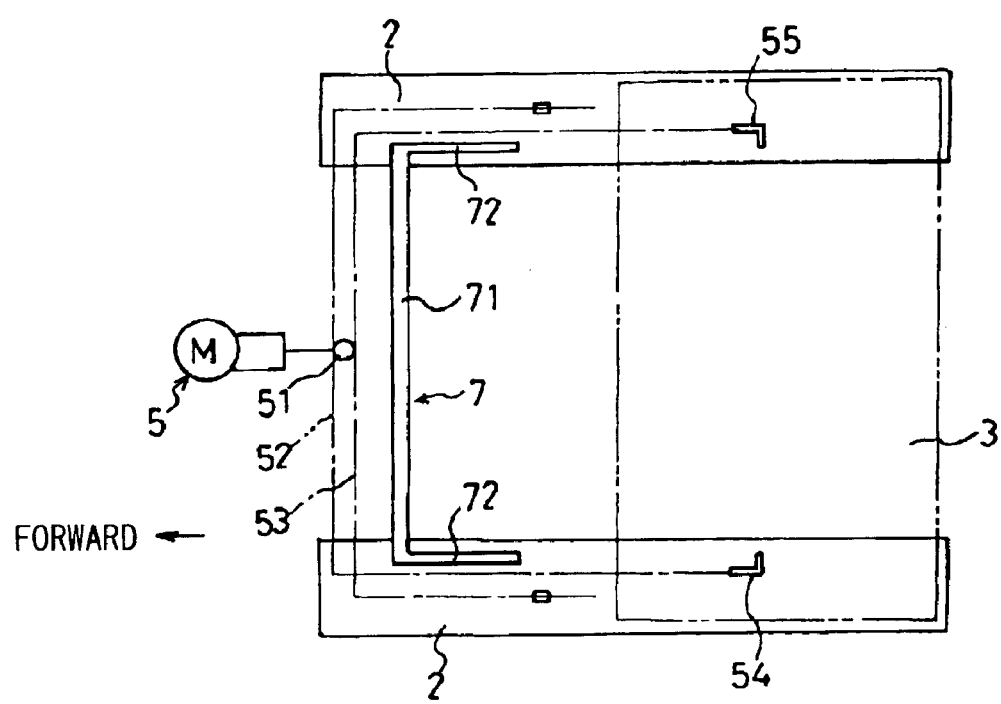
FIG. 6 is a top view of the sunroof device according to the present invention.

Further, as shown in FIG. 6, respective guide rails 2 support each lateral side of the movable panel 3 so that the movable panel 3 can move forward and backward. Each guide rail 2 is fixed within the roof 10. The movable panel 3 is connected to a driving device 5 via a cable gear 51, cables 52 and 53, and connecting members 54 and 55. The driving device 5 moves the movable panel 3 forward and backward.

Figure 2:
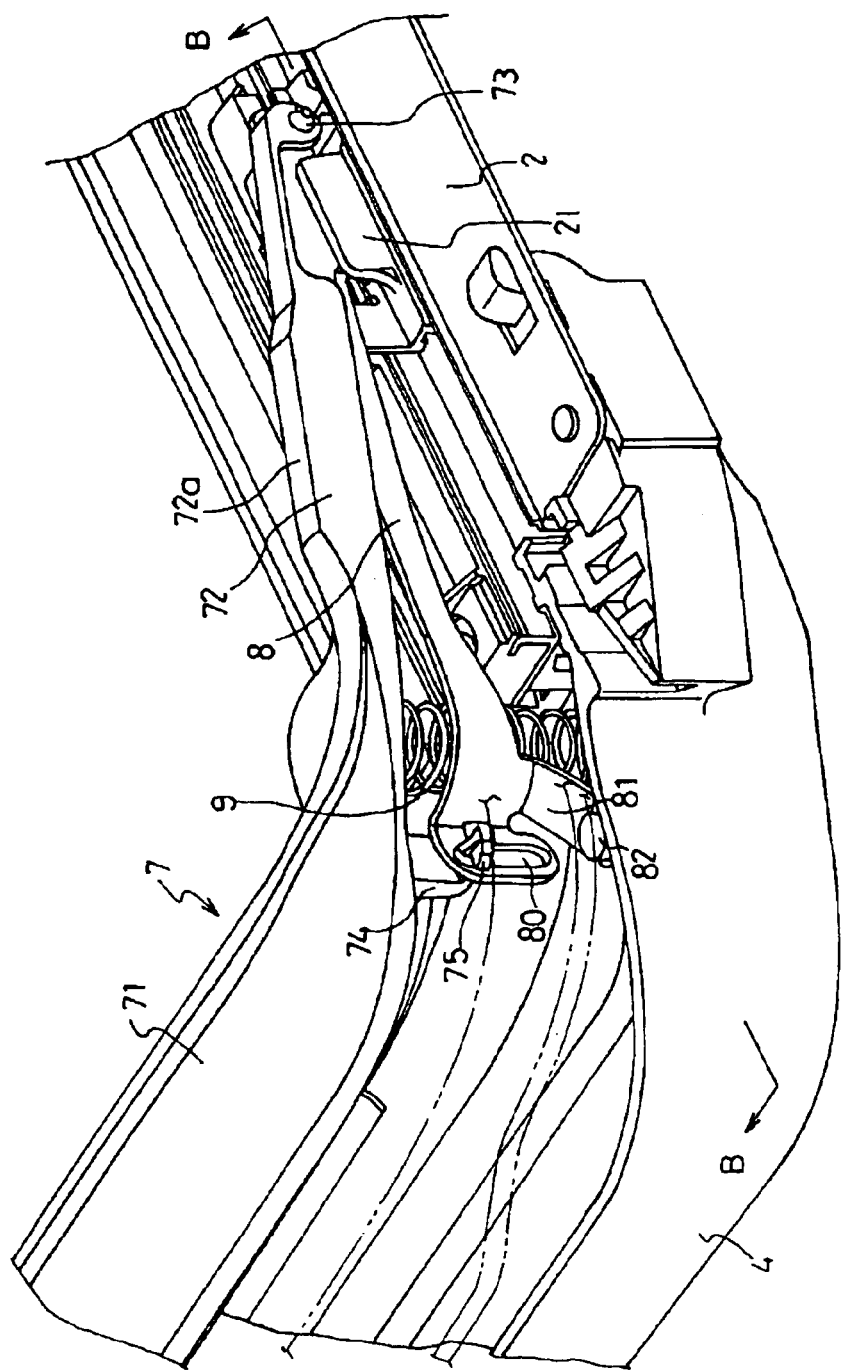
FIG. 2 is a perspective view taken from the A-portion of FIG. 1.

Next, as shown in FIG. 2, the deflector 7 includes a cowling portion 71 and supporting portions 72. The cowling portion 71 extends along an inner front end of the opening 11. The respective supporting portions 72 extend backward along inner lateral ends of the opening 11 from each lateral end of the cowling portion 71. Respective rear ends of the supporting portions 72 are rotatably connected to respective brackets 21 fixed to the guide rails 2 via respective pivots 73.

Additionally, a frame 4 for connecting front ends of the guide rails 2 is provided. Each lateral end of the frame 4 is connected to respective front ends of the guide rails 2, and a spring 9 (a biasing means) is provided between the frame 4 and the deflector 7. The spring 9 biases the deflector 7 upward.

Respective stopping members 8 are rotatably supported by the pivots 73 as with the supporting portions 72. The stopping members 8 are provided below the supporting portions 72 of the deflector 7 and extend along the inner lateral ends of the opening 11 as with the supporting portions 72. Respective elongated holes 80 (an engaged portion or a movement restricting means) and flange portions 81 are provided at respective front ends of the stopping members 8. Each elongated hole 80 extends along an extending direction of the deflector 7. The flange portions 81 extend forward as well as downward. Respective hooked portions 75 are (an engaging portion) provided on respective arms 74 projecting downward from respective lateral ends of a bottom surface of the cowling portion 71 of the deflector 7. The hooked portions 75 are slidably inserted in the elongated holes 80. Thus, the stopping members 8 are extended upward with the deflector 7 by the spring 9.

Figure 3:
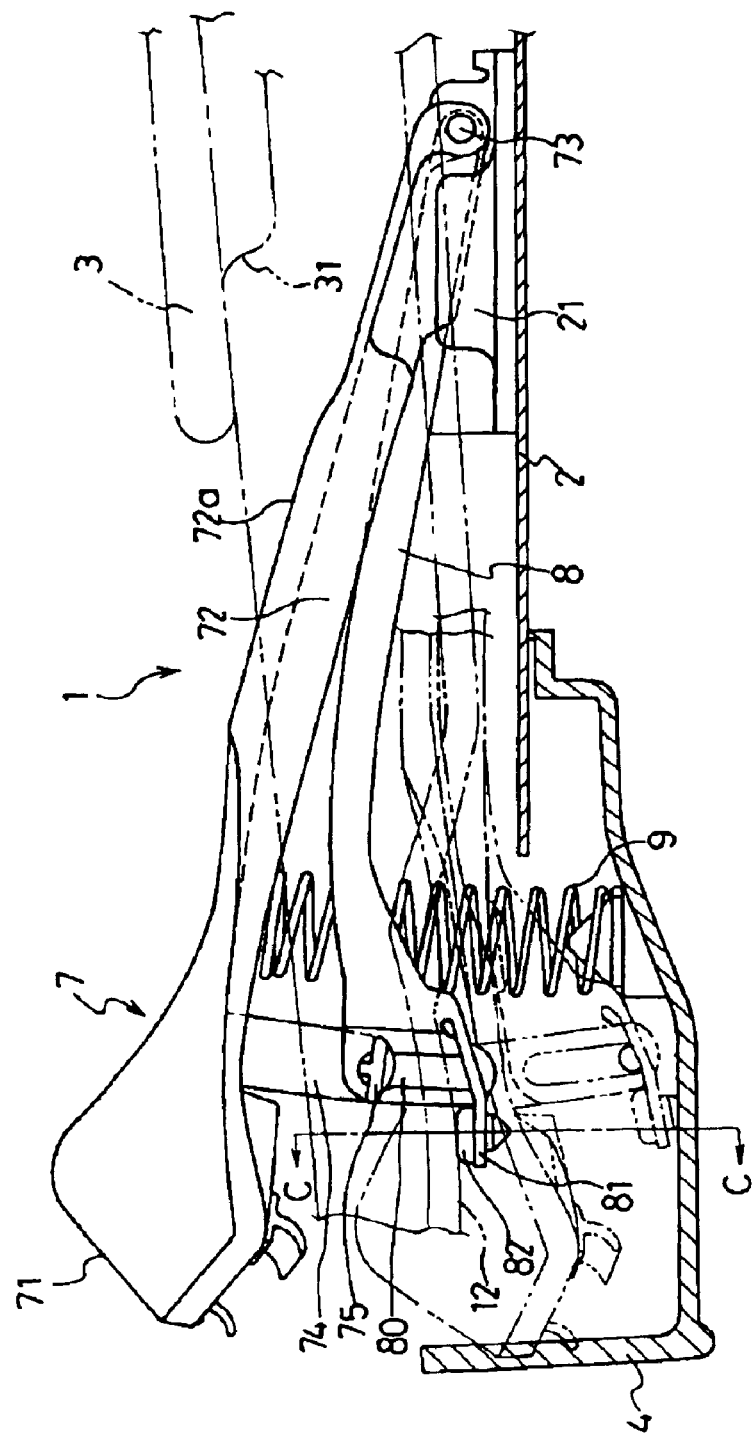
FIG. 3 is a cross sectional view taken along the line B—B of FIG. 2.
Figure 4:
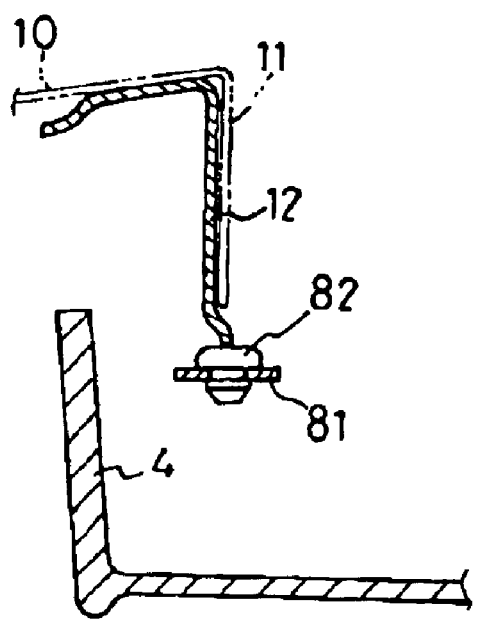
FIG. 4 is a cross sectional view taken along the line C—C of FIG. 3.

As shown in FIG. 3, respective contact members 82 are provided on respective front ends of the flange portions 81 of the stopping members 8. When the deflector 7 extends to the upper limit, as shown in FIG. 4, the contact members 82 contact with respective lower ends of respective flange members 12 fixed to the roof 10, and then extending movement of the deflector 7 is blocked. Consequently, an extending height of the deflector 7 is restricted by the hooked portions 75. On one hand, when the stopping members 8 are folded as indicated in FIG. 3 by a dotted line, the contact members 82 contact with the frame 4, and then the stopping members 8 cannot move downward any further.

Next, operation of the sunroof device 1 including the above-described deflector 7 is explained below.

Figure 5:
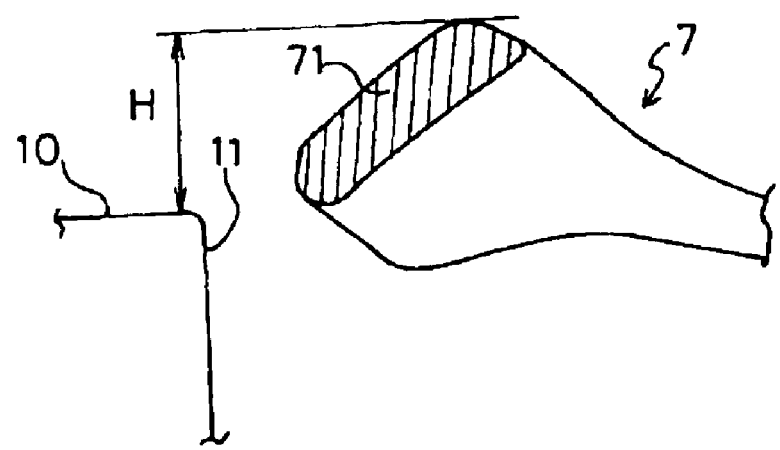
FIG. 5 is a cross sectional view taken along the line D—D of FIG. 1.

With reference to a state indicated in FIG. 3 by a full line, when the movable panel 3 moves forward to close the opening 11, upper surfaces 72a of the supporting portions 72 of the deflector 7 contact with a bottom surface of a reinforced portion 31 projecting from a bottom surface of the movable panel 3. The deflector 7 is depressed against the spring 9, and the deflector 7 is folded as indicated in FIG. 3 by the dotted line. Then the hooked portions 75 are located at lowermost portions of the elongated holes 80, the stopping members 8 cannot move relative to the supporting portions 72, so vibration of the stopping members 8 is prevented. On one hand, when the movable panel 3 moves backward to open the opening 11, the deflector 7 is lifted by the spring 9 so as to extend upward. When the upper surfaces 72a of the supporting portions 72 are detached from the bottom surface of the reinforced portion 31, an upper end of the cowling portion 71, as shown in FIG. 5, is lifted to a position with the required extending height of H from the upper surface of the roof 10.

In the foregoing embodiment according to the present invention, the common pivots 73, which rotatably support the stopping members 8 and the supporting portions 72 of the deflector 7, may be replaced with different pivots. Additionally, each stopping member 8 may be replaced with plural members which enable the deflector 7 to extend further upward.

According to the present invention, the extending height of H corresponds to the sum of moving distance of the deflector 7 relative to the stopping members 8 (a first predetermined distance) and moving distance of the stopping members 8 relative to the roof 10 (a second predetermined distance), and then the deflector 7 can extend further upward. Thus, with reference to a problem of wind blowing in a vehicle compartment concurrent with enlargement of opening size, when a deflector which can extends further upward is required to solve the problem, the present invention can be applied.

The principles, preferred embodiments and mode of operation of the present invention have been described in the foregoing specification. However, the invention which is intended to be protected is not to be construed as limited to the particular embodiments disclosed. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A sunroof device comprising:
    a movable panel provided at a roof of a vehicle for opening and closing an opening of the roof; and
    a deflector provided at a front end of the opening, the deflector being movable upward above the roof and pivotal below the roof depending on a position of the movable panel;
    wherein the deflector has an engaging portion, a pivotal stopping member has an engaged portion engageable with the engaging portion and movable by a first predetermined distance relative to the deflector until the engaging portion engages with an upper end of the engaged portion, and the stopping member and deflector are both pivotal upwardly by a second predetermined distance relative to the roof.

2. A sunroof device, according to claim 1, wherein the deflector is biased upward by a biasing means which is provided between the deflector and the roof.

3. A sunroof device, according to claim 2, wherein the biasing means is a coil spring.

4. A sunroof device, according to claim 2, wherein extending movement of the deflector is stopped by the stopping member.

5. A sunroof device, according to claim 1, wherein the deflector and the stopping member are rotatably connected to the roof by a common pivot.

6. A sunroof device, according to claim 4, wherein the engaged portion includes an elongated hole provided in the stopping member.

7. A sunroof device, according to claim 6, wherein the elongated hole extends in an extending direction of the deflector and the engaging portion has a hooked portion which is inserted in the elongated hole.

8. A sunroof device, according to claim 7, wherein the stopping member is movable by the first predetermined distance relative to the engaging portion until the hooked portion engages with one end of the elongated hole, and the stopping member is further movable together with the deflector by the second predetermined distance relative to the roof after the hooked portion engages with the one end of the elongated hole.

9. A sunroof device comprising:
    a movable panel provided at a roof of a vehicle for opening and closing an opening of the roof; and
    a deflector provided at a front end of the opening, the deflector being movable upward above the roof and pivotal below the roof depending on a position of the movable panel,
    wherein the deflector has an engaging portion, a stopping member has a movement restricting means engageable with the engaging portion for restricting movement of the stopping member relative to the deflector and movable by a first predetermined distance relative to the deflector until the engaging portion engages with one end of the movement restricting means, and the stopping member is further pivotal as a unit with the deflector by a second predetermined distance relative to the roof.

10. A sunroof device, according to claim 9, wherein the movement restricting means includes an elongated hole provided in the stopping member.

11. A sunroof device, according to claim 10, wherein the elongated hole extends in an extending direction of the deflector and the engaging portion has a hooked portion which is inserted in the elongated hole.

12. A sunroof device, according to claim 11, wherein the stopping member is movable by the first predetermined distance relative to the engaging portion until the hooked portion engages with one end of the elongated hole, and the stopping member is further movable together with the deflector by the second predetermined distance relative to the roof after the hooked portion engages with the one end of the elongated hole.

13. A sunroof device comprising:
- a movable panel provided at a roof of a vehicle for opening and closing an opening of the roof;
- a guide rail provided on the roof for supporting the movable panel;
- a deflector having a cowling portion which is movable upward above the roof when the opening of the roof is opened and having a supporting portion which extends along the guide rail and rotatably connected to the guide rail; and
- a stopping member rotatably supported on the guide rail and movably connected relative to the supporting portion of the deflector so that the cowling portion of the deflector can be pivoted upwardly relative to the stopping member and moved further upward as a unit with the stopping member when the deflector is rotated at the supporting portion of the deflector.

14. A sunroof device, according to claim 13, further comprising:
- a spring provided between the deflector and the roof for biasing upward the cowling portion of the deflector.

15. A sunroof device, according claim 13, further comprising:
- an elongated hole provided on the stopping member for movably connecting the cowling portion of the deflector.

* * * * *

UNITED STATES PATENT AND TRADEMARK OFFICE
CERTIFICATE OF CORRECTION

PATENT NO.    : 6,877,800 B2
DATED         : April 12, 2005
INVENTOR(S)   : Kenji Maeta et al.

It is certified that error appears in the above-identified patent and that said Letters Patent is hereby corrected as shown below:

Column 6,
Line 14, after "according", insert -- to --.

Signed and Sealed this

Sixteenth Day of August, 2005

JON W. DUDAS
*Director of the United States Patent and Trademark Office*